United States Patent [19]
Pawlicki et al.

[11] Patent Number: 5,995,682
[45] Date of Patent: *Nov. 30, 1999

[54] METHOD FOR RESIZING OF A DIGITAL IMAGE

[75] Inventors: Thaddeus F. Pawlicki, Rochester; Roger S. Gaborski, Pittsford, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,731

[22] Filed: Mar. 19, 1997

[51] Int. Cl.$^6$ .................................................. G06K 9/32
[52] U.S. Cl. ........................ 382/300; 382/156; 382/298
[58] Field of Search .......................... 382/300, 298–299, 382/266, 155–160, 269, 301–302, 274; 348/441, 581; 345/132, 127; 364/723, 724.1; 358/525, 451, 428

[56] References Cited

U.S. PATENT DOCUMENTS

| | | | |
|---|---|---|---|
| 5,054,100 | 10/1991 | Tai ........................................... | 382/300 |
| 5,070,465 | 12/1991 | Kato et al. ................................ | 345/441 |
| 5,327,257 | 7/1994 | Hrytzak et al. .......................... | 358/447 |
| 5,475,803 | 12/1995 | Stearns et al. ........................... | 345/436 |
| 5,706,401 | 1/1998 | Tresp ........................................ | 706/25 |

OTHER PUBLICATIONS

Delbourgo, R., and Gregory, J.A, Rational Quadratic Spline Interpolation to Monotonic Data IMA Journal of Numerical Analysis, vol. 3 pp. 141–152, Jan. 10, 1983.

*Primary Examiner*—Leo H. Boudreau
*Assistant Examiner*—Ishrat Sherali
*Attorney, Agent, or Firm*—William F. Noval

[57] ABSTRACT

A method of processing a digital image comprising the steps of:

providing an input digital image having an input size;

providing the output size of a desired output digital image;

inputting the provided input digital image and the provided desired output digital image size to a weight estimation sub-system which operates to generate several weight derivative estimates;

inputting the provided input digital image to an x-direction derivative estimation sub-system which produces an array of x-direction derivative estimates;

inputting the provided input digital image, the weight derivative estimates and the x-direction estimates to an x-direction interpolated value estimation subsystem which produces in intermediate digital image which has the same number of rows as said input digital image while having the same number of columns as said output digital image;

operating on said intermediate digital image by a y-direction derivative estimation sub-system to produce y-direction derivative estimates;

inputting the intermediate digital image, the weight derivative estimates, and the y-direction derivative estimates to a y-direction interpolated value estimation sub-system to produce said output digital image.

1 Claim, 10 Drawing Sheets

$$S_o = \frac{I(Pright_o) \cdot (Prw_o)^2 + \dfrac{I(Pright_o) \cdot D(Pleft_o) + I(Pleft_o) \cdot D(Pright_o)}{delt(Pleft_o)} \cdot Prw_o \cdot Plw_o + I(Pleft_o) \cdot Plw_o}{(Prw_o)^2 + \dfrac{D(Pleft_o) + D(Pright_o)}{delt(Pleft_o)} \cdot Prw_o \cdot Plw_o + (Plw_o)^2}$$

FIG. 9

METHOD FOR RESIZING OF A DIGITAL IMAGE

FIELD OF THE INVENTION

The present invention relates in general to digital image processing and more particularly to image processing and presentation of digital medical images.

BACKGROUND OF THE INVENTION

Interpolation is the process of estimating the intermediate value of a continuous event from discrete samples. Interpolation is used extensively in digital image processing to magnify or reduce images and to correct spatial distortions. Several interpolation functions have been used for image resampling (Maeland, E., *On the Comparison of Interpolation Methods, IEEE Transactions on Medical Imaging,* Vol. 7, No. 3, September 1988, pp. 213–217). It is widely accepted that image quality can be improved by resampling using a high-resolution cubic convolution function as compared to the nearest neighbor, linear, or cubic B-spline functions. (Keys, R. G., *Cubic Convolution Interpolation for Digital Image Processing, IEEE Transactions on Acoustics, Speech, and Signal Processing,* Vol. ASSP-29, No. 6, December 1981). For this reason, cubic spline interpolation has become a widely used method in digital image processing. However, cubic spline interpolation generates objectionable image artifacts under a number of real world imaging conditions.

Lien, et. al., Lien, Sheue-Ling, et. al. Method and Apparatus for Shading Images, U.S. Pat. No. 5,063,375, Nov. 5, 1991 disclosed a method for generating shaded images based on surface normal calculation. Both Kimura, et. al., Apparatus to Improve Image Enlargement or Reduction by Interpolation. U.S. Pat. No. 5,301,226, Apr. 5, 1994 and Potter, et. al., Method and Apparatus for Enhancing Frequency Domain Analysis. U.S. Pat. No. 5,473,555, Dec. 5, 1995, present methods of interpolation based on frequency domain analysis. Takayama, et. al., Hybrid Interpolation and Non-Interpolation Method and Apparatus for Image Enlarging and Contraction. U.S. Pat. No. 5,400,154, Mar. 21, 1995 present a hybrid method to image interpolation. Each of these methods is disadvantageous.

Hrytzak, et. al., Method and Apparatus for Adaptively Interpolating a Digital Image. U.S. Pat. No. 5,327,257, Jul. 5, 1994, present an adaptive method for interpolation based on a system which switches between sets of precomputed kernels on the basis of image data. The drawbacks of precomputed kernels are the same as those of cubic convolution and linear averaging discussed above—these techniques being based on precomputed kernels.

SUMMARY OF THE INVENTION

It is an object of the present invention to resize a digital image without the loss of sharpness or the type of artifacts typically generated by a resizing operation.

This object is achieved by using a rational quadratic interpolation function to generate the intermediate pixel values required for image resizing.

It is another object of the invention to perform the resizing in a computationally efficient manner.

This second object is achieved using a neural network as a universal approximator rather than a sequence of logical computational operations.

According to a feature of the present invention there is provided a method of processing a digital image comprising the steps of:

providing an input digital image having an input size;
providing the output size of a desired output digital image;

inputting the provided input digital image and the provided desired output digital image size to a weight estimation sub-system which operates to generate several weight derivative estimates;

inputting the provided input digital image to an x-direction derivative estimation sub-system which produces an array of x-direction derivative estimates;

inputting the provided input digital image, the weight derivative estimates and the x-direction estimates to an x-direction interpolated value estimation subsystem which produces in intermediate digital image which has the same number of rows as said input digital image while having the same number of columns as said output digital image;

operating on said intermediate digital image by a y-direction derivative estimation sub-system to produce y-direction derivative estimates;

inputting the intermediate digital image, the weight derivative estimates, and the y-direction derivative estimates to a y-direction interpolated value estimation sub-system to produce said output digital image.

Advantages

The method of the invention has the advantage of avoiding the overshoot and undershoot problems associated with commercially available methods of image resizing. Over and under shooting of control data during the interpolation process results in objectionable image artifacts. The method presented here also has the advantage of rendering the resized image with greater sharpness than available through commercially available methods.

The method of the invention also has the advantage of computational efficiency. The rational quadratic function used by the invention does not require the two-dimensional calculations needed to find surface normals. Because of the robust properties of the rational quadratic function coupled with the ability of a neural-network to function as a universal approximator, enables the invention to efficiently encompass a wider set of non-linear functions than is possible with simple bit-shifting. This improves the robustness of the invention over the prior art.

The invention has the advantage of not requiring frequency analysis based on a two-dimensional Fourier transform, a computationally intense operation. The disclosed invention performs all operations in the spatial domain and thereby presents a faster, simpler and more robust solution.

The present invention has the advantage that the use of a rational quadratic computational model yields improved image quality. Also the use of a neural network as a universal approximator considerably simplifies the system, making it more robust.

The use of the rational quadratic computational model overcomes the drawbacks of Hrytzak. Adaptive switching adds the complexity of the algorithm by requiring complex control circuitry. The use of a neural network as a universal approximator trained to emulate the rational quadratic function obviates the need for such complex control circuitry.

BRIEF DESCRIPTION OF THE DRAWINGS

FIG. 8 and FIG. 9 have similar contextual explanations.

FIG. 8 shows a detailed explanation of the derivative estimation sub-systems of box 510 and box 550. In block diagram form the major operations involved in derivative estimation are shown. FIG. 8 is to be implicitly understood in the context of an image processing system in the same way that FIG. 7 explicitly provides a understanding for FIG. 6.

FIG. 9 shows a detailed explanation of the interpolated value estimation systems of box 530 and box 555. FIG. 9 is to be implicitly understood in the context of an image processing system in the same way that FIG. 7 explicitly provides a understanding for FIG. 6.

DETAILED DESCRIPTION OF THE INVENTION

The present invention provides an efficient method for interpolation of a digital image based on rational quadratic functions (Delbourgo, R., and Gregory, J. A., $C^2$ *Rational Quadratic Spline Interpolation to Monotonic Data, IMA Journal of Numerical Analysis*, Vol. 3, 1983, pp. 141–152). This method has several advantages including the elimination of artifacts characteristic of cubic spline interpolation and improved sharpness characteristics.

Figure 1:
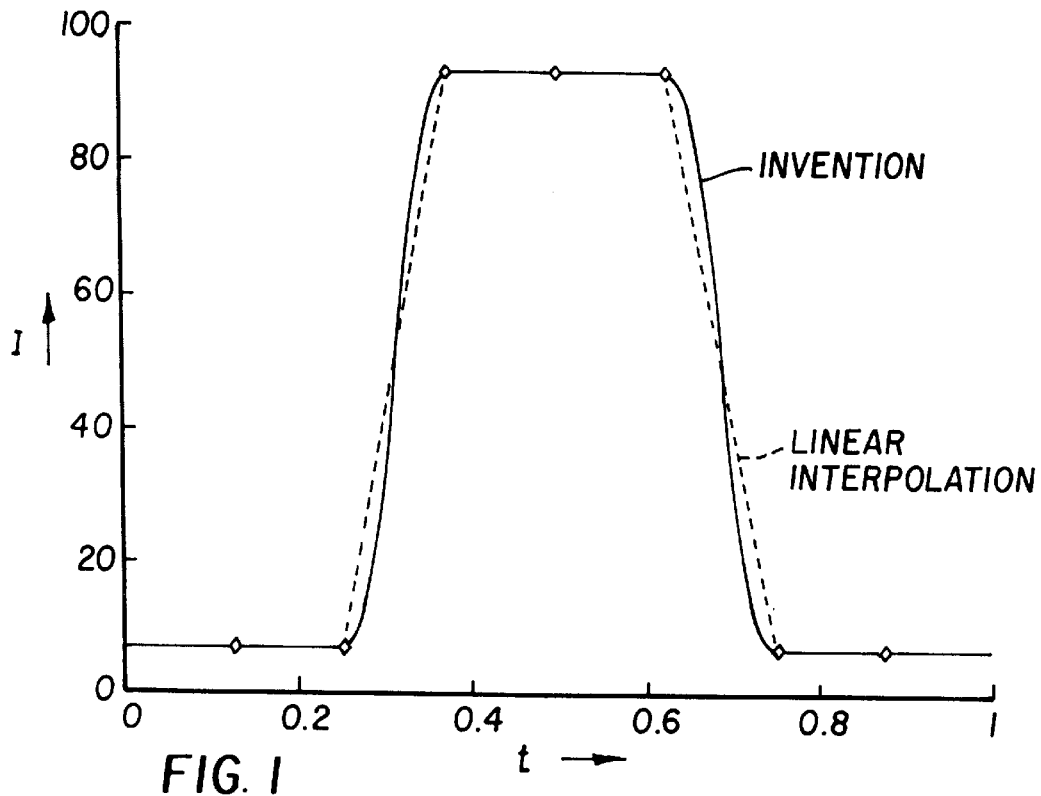
FIG. 1 graphs the output of the invention (solid line) compared to the output of linear interpolation (dashed line). The invention is clearly superior in that it generates a smooth function and has stepper (sharper) slopes in regions of transition. Input control data is show as diamonds.

FIG. 1 demonstrates the superiority of the invention over linear interpolation. FIG. 1 graphs the output of the invention (solid line) compared to the output of linear interpolation (dashed line). The invention is clearly superior in that it generates a smooth function and has stepper (sharper) slopes in regions of transition. Input control data is show as diamonds.

Figure 2:
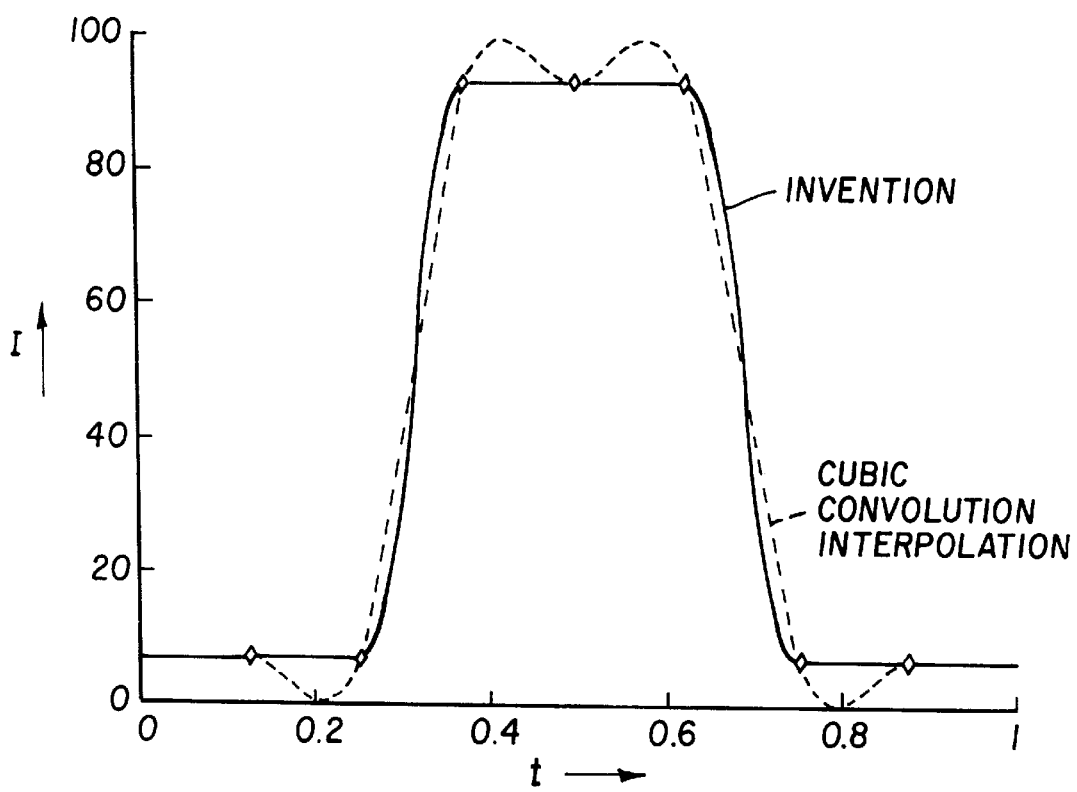
FIG. 2 graphs the output of the invention (solid line) compared to the output of cubic convolution interpolation (dashed line). The invention is clearly superior in that it never overshoots nor undershoots the input and has steeper (sharper) slopes in regions of transition. Input control data is shown as diamonds.

FIG. 2 demonstrates the superiority of the invention over cubic convolution interpolation. The nine diamonds indicate the original input data points. The dashed line indicates the result of cubic convolution interpolation. The solid line indicates the result of the invention. Cubic convolution represents an improvement over linear interpolation in terms of continuity and sharpness. However, cubic convolution results in overshoot and undershoot of the original data points. Undershoots are noticed at the second to third, and seventh to eight intervals. Overshoots are noticed at the fourth to fifth, and fifth to sixth intervals. Such overshooting and undershooting can yield objectionable artifacts in interpolated image data. FIG. 2 demonstrates that up to fifteen percent of the available dynamic range can be wasted on spurious overshooting and undershooting. The invention yields a smooth function which does not overshoot or undershoot the original data and is therefore much more desirable for image processing. In addition, the invention results in a function with a steeper slope in the third to fourth and sixth to seventh intervals. The steeper slope results in a sharper, more pleasing image; and therefore is more desirable than the shallow slope generated by cubic convolution interpolation.

Figure 3:
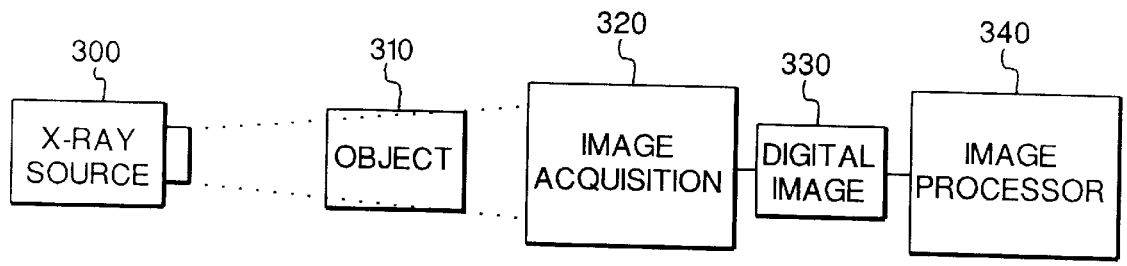
FIG. 3 is a block diagram of a digital image acquisition system.

Turning now to FIG. 3, The method of the present invention operates as a series of operations performed on a digital image of a body part. The digital image can be formed by the digital image acquisition system of FIG. 3. As shown, x-ray source 300 projects x-rays through object 310 (such as a body part) to image acquisition system 320. The image acquisition system can be, for example, (1) standard x-ray screen/film combination which produces an x-ray film image which is processed chemically or thermally and the processed film digitized by a scanner/digitizer; (2) a computed radiography (CR) system where a latent x-ray image is formed in a storage phosphor and a corresponding digital image is produced by reading out the storage phosphor by a CR reader; (3) a diagnostic scanner (such as MRI, CT, US, PET, Ultrasound), which produces an electronic x-ray image which is digitized; and (4) a direct digital acquisition system, such as a CCD or a TFT array.

Figure 4:
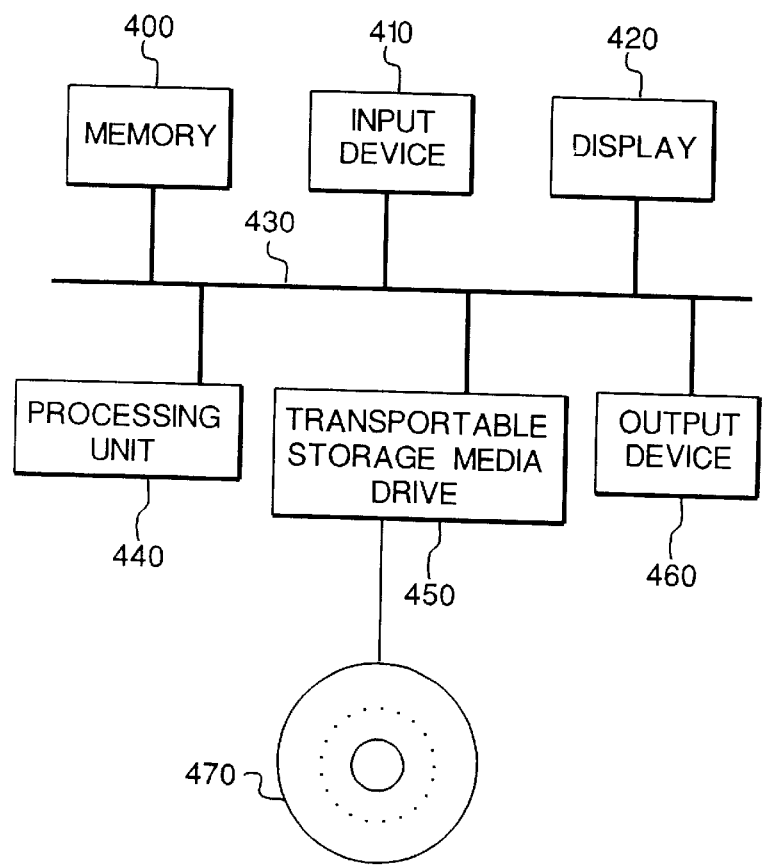
FIG. 4 is a block diagram of and image processor for carrying out the method of the present invention.

The digital image 330 is processed in an image processor 340, according to the method of the present invention. The image processor can take the form of an digital computer, such as illustrated in FIG. 4. In such a case, one or more of the steps of said method can be carried out using software routines. The image processor can also include hardware or firmware for carrying out one or more of said method steps. Thus, the step of the method of the invention can be carried out using software, firmware, hardware, either alone or in any preferable combination.

As shown in FIG. 4., a digital computer includes a memory 400 for storing digital images, application programs, operating systems, etc. Memory 400 can include mass memory (such as hard magnetic disc or CD ROM), and fast memory, (such as RAM). A computer also includes input devices 410 (such as a keyboard, mouse, touch screen), display 420 (CRT monitor, LCD), central processing unit 440 (microprocessor), output device 460 (thermal printer, dot matrix printer, laser printer, ink jet printer, diagnostic transparency printer). A computer can include a transportable storage medium drive 450 for reading from and/or writing to transportable storage media 470, such as a floppy magnetic disk or writeable optical compact disk (CD). Components 400, 410, 420, 440, 450 and 460 are connected together by a control/data bus 430.

As used in this application, computer readable storage medium can include, specifically, memory 400 and transportable storage media 470. More generally, computer storage media may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

Figure 5:
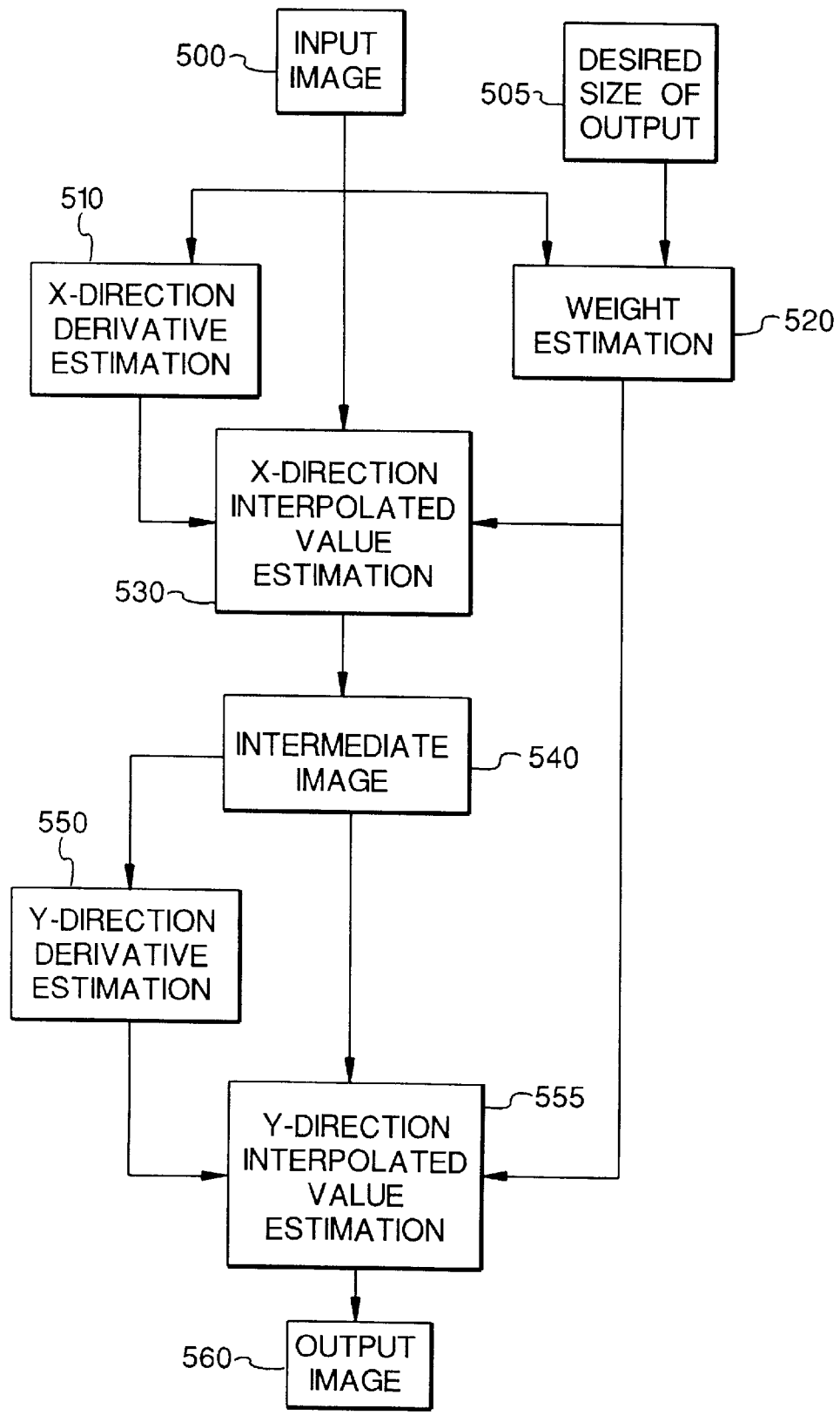
FIG. 5 shows in block diagram form the major method steps of the invention.

The invention operate as a series of operations performed upon the unknown input digital image 500. FIG. 5 depicts a block diagram of the method of the present invention as an example a radiographic film transformed into a digital representation by a scanner/digitizer which scans at approximately a 50 micron dot size. However, the technique disclosed herein could also be used on a standard storage phosphor or any diagnostic scanner (such as MRI, CT, US, PET, Ultrasound) device provided that adequate resolution could be achieved. In the preferred embodiment 8 to 12 bit of resolution is regularly employed. It is through methods such as these that the input image 500 is presented as an input digital image to be processed by the method of the invention. The purpose of the invention is to generate an high quality image of a different size at the output image 560. In the preferred embodiment, the input image 500 is typically at least 256×256 pixels in spatial resolution and is represented by at least 1 byte (8 bits) of gray level data, while the output image 560 is typically at most 4096×4096 pixels in spatial resolution and is typically represented by 2-byte (16 bits) of gray level data.

As shown in FIG. 5, the input image (box 500) is presented to the system embodying the invention. The size of the desired output (box 505) is also presented as input to the system. The weight estimation sub-system (box 520— detailed in FIG. 6, with an example embodiment in FIG. 7) operates to generate several series of numbers specifying the weighting function used by the rest of the system. The weight estimation system is described in greater detail below.

The input image 500 also serves as input to the x-direction derivative estimation sub-system (box 510—detailed in FIG. 8), which produces an array of x-direction derivative estimates. The direction derivative estimation sub-systems is described in greater detail below.

The input image 500 also serves, along with weight and x-direction (boxes 510,520) derivative estimates, as input to the x-direction interpolated value estimation sub-system (box 530—detailed in FIG. 9) which operates on these inputs to produce an intermediate image (box 540), stored in memory. The intermediate image has the same number of rows as the input image while having the same number of columns as the output image.

The intermediate image is operated upon by the y-direction derivative estimation sub-system (box 550— detailed in FIG. 8) to produce x-direction derivative estimates used elsewhere in the invention. The y-derivative estimation sub-system (box 550) is, essentially the same as the x-derivative estimation sub-system (box 510) except that the two systems operate on different dimensions of the image at different times. The operations that they perform are essentially the same.

The intermediate image, along with weight and y-direction derivative estimates, serve as input to the y-direction interpolated value estimation sub-system (box 555—detailed in FIG. 9) which operates on these inputs to produce an output image (box 560). The output image 560 represents the final product generated by the invention.

Figure 5A:
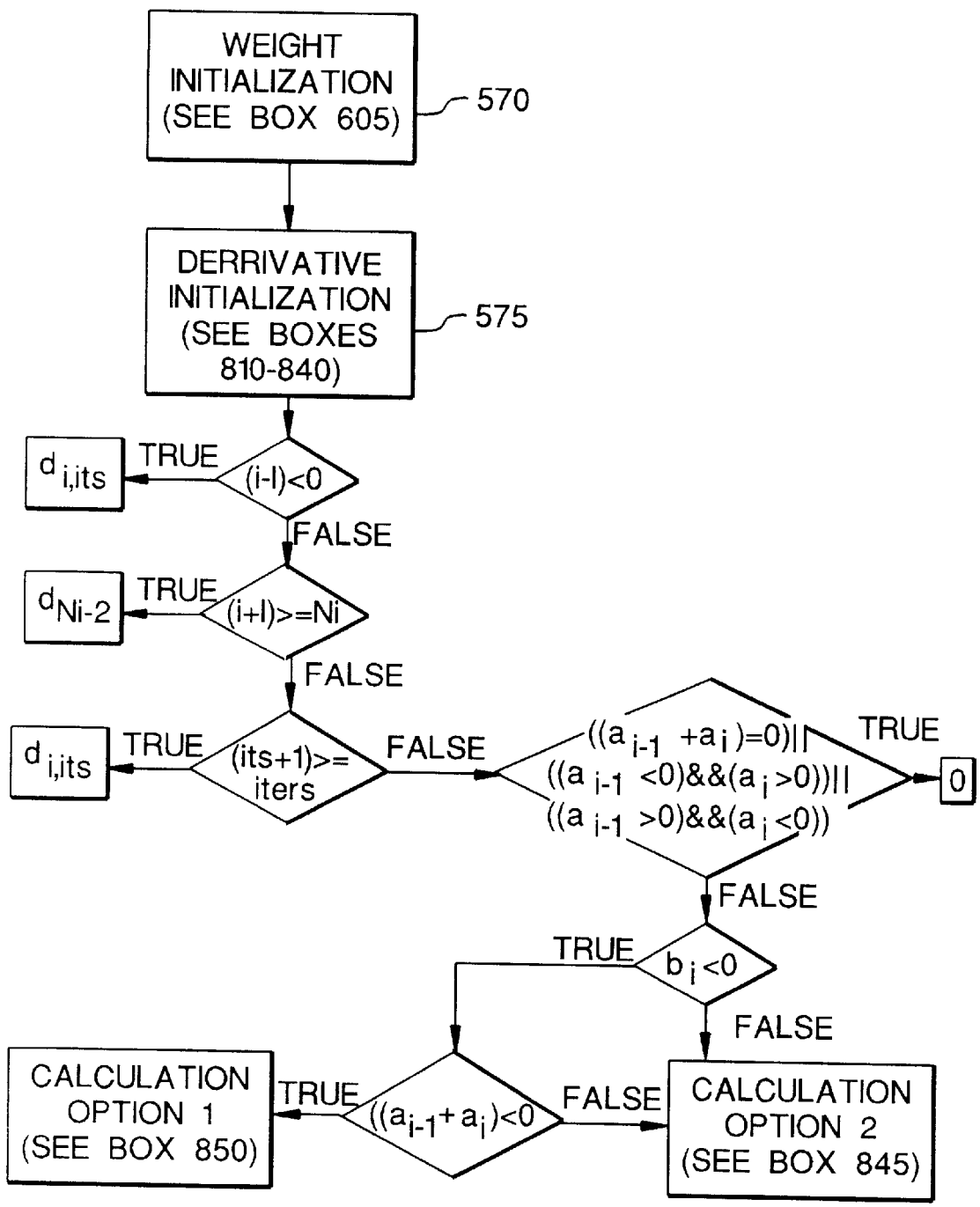
FIG. 5a shows the flow of computation outlining the algorithm for the derivative calculations.

FIG. 5a shows the logic diagram outlining the flow of computation involved in the calculation of the derivatives.

Figure 6:
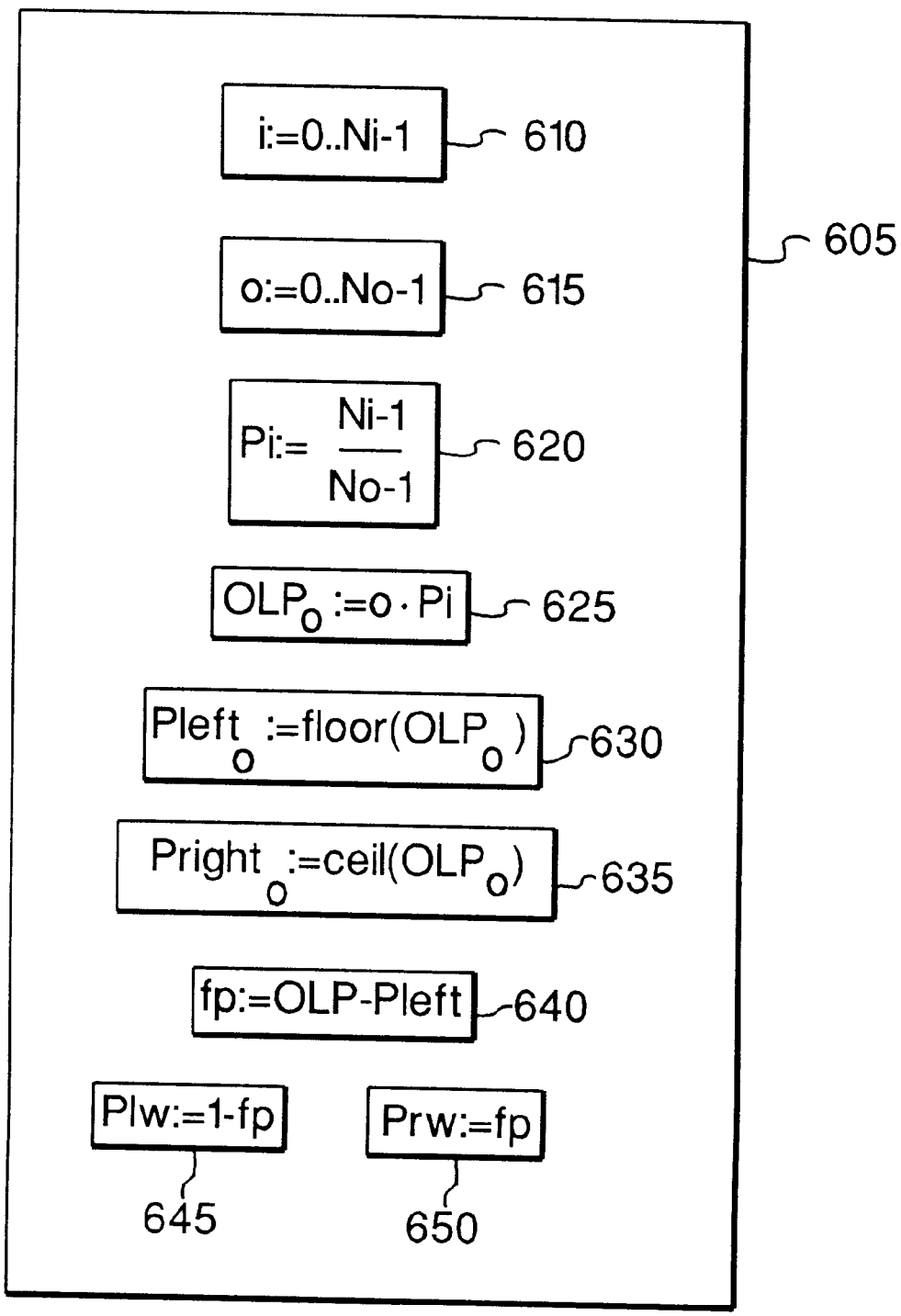
FIG. 6 shows in a detailed explanation of the Weight Estimation Sub-system (box 520). In block diagram form the major operations involved in the weight estimation are shown.
Figure 7:
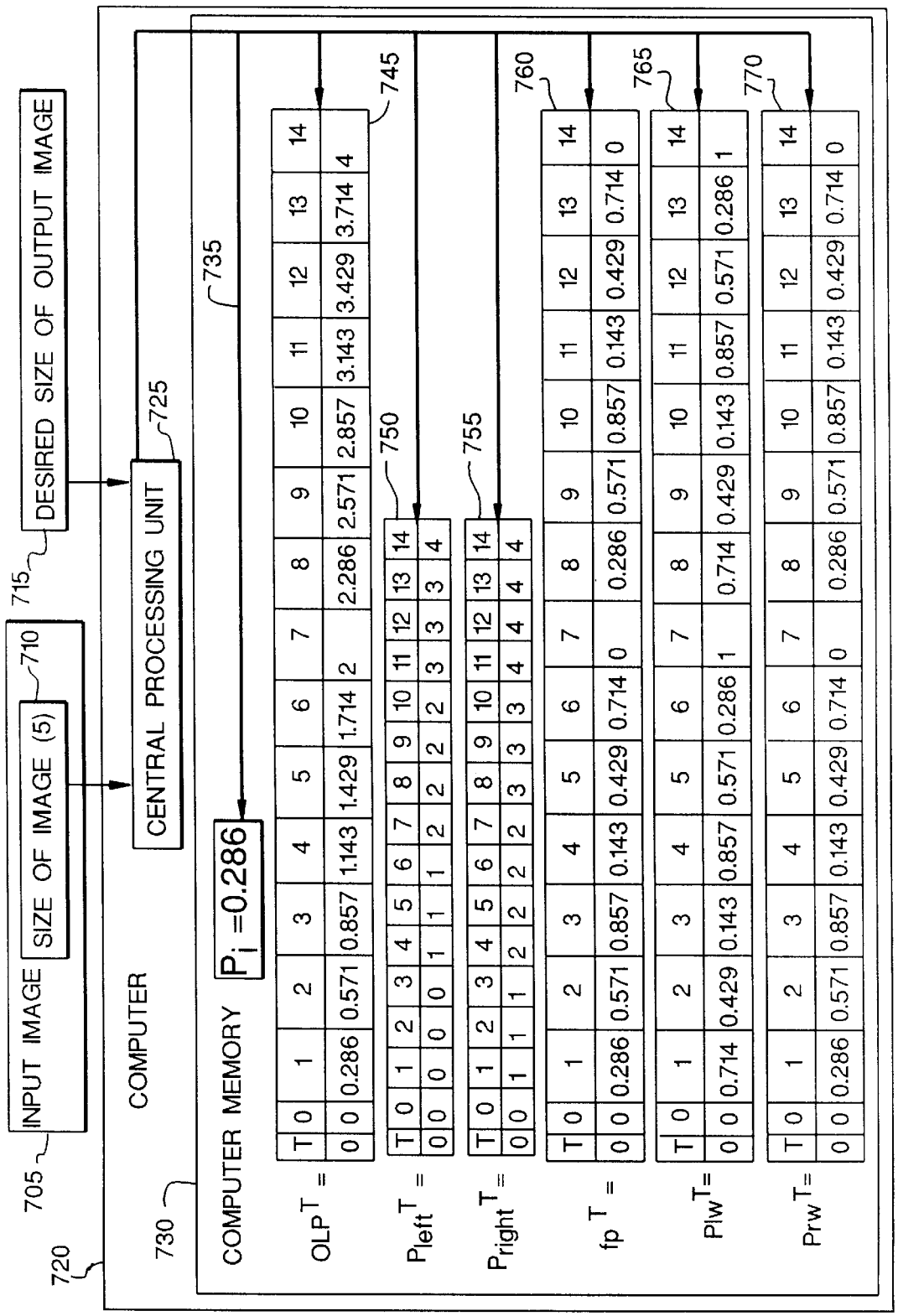
FIG. 7 shows a detailed explanation of how the Weight Estimation system sketched in FIG. 6 is implemented in the context of an image processor sketched in FIG. 4. A central processing unit acts on inputs to realize the functionality shown in FIG. 6 as pluralities of numerical values stored in computer memory.
Figure 8:
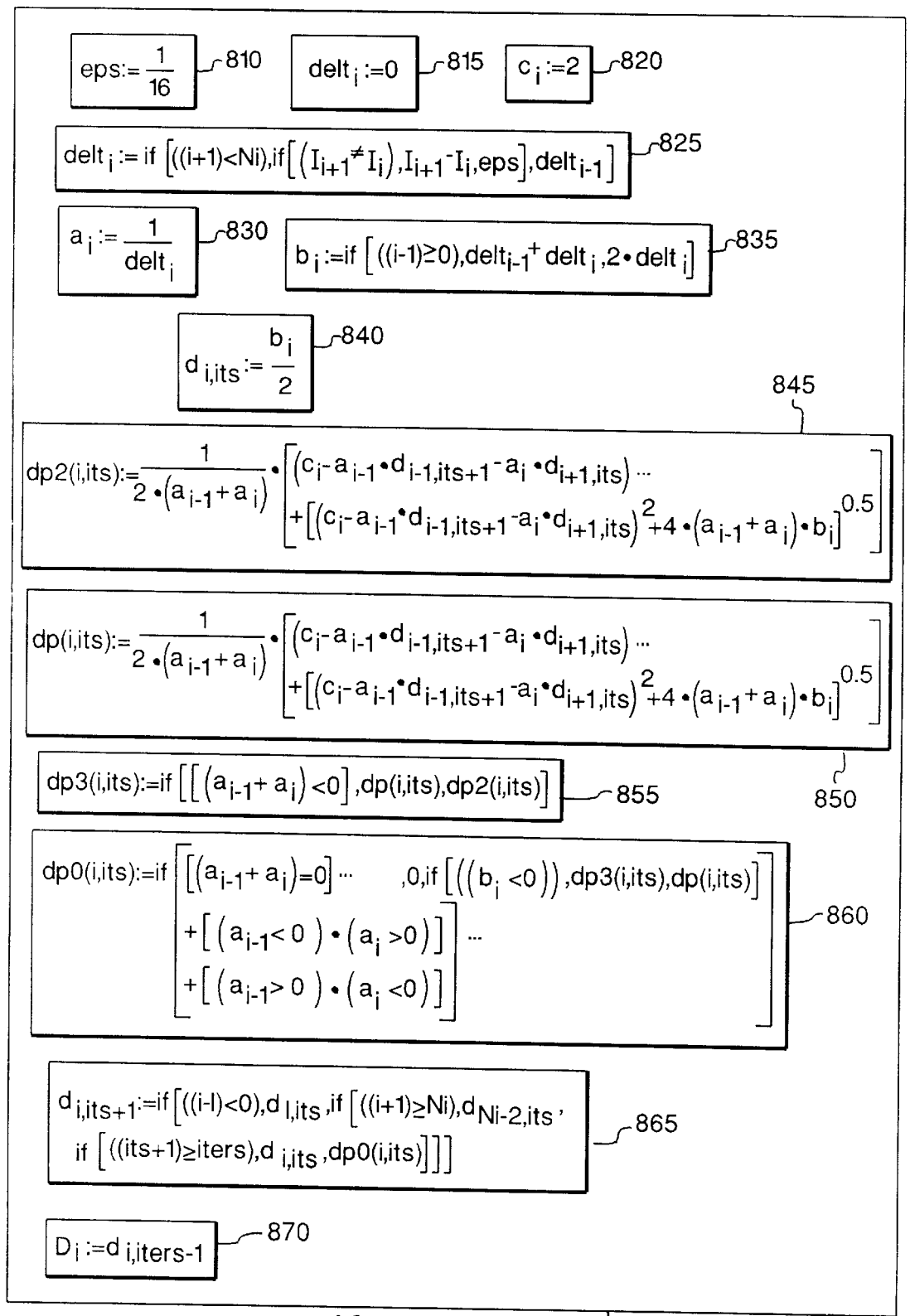

FIGS. 6, 7, and 8 contain the formulae of the preferred embodiment to the algorithm.

FIG. 6 illustrates an embodiment of the weight estimation sub-system (box 520). The number Ni in FIG. 6 represents the size of the input image; for a 256×256 pixel image Ni would equal 256. The number No in FIG. 6 represents the size of the output image; for a 4096×4096 pixel image No would equal 4096. The sequence of integers named I, (box 610) which begins with 0 and ends with Ni, is used to refer to the pixels of the input image. The sequence of integers named o, (box 615) which begins with 0 and ends with No −1, is used to refer to the pixels of the output image. The value Pi (box 620) is calculated to refer to the size change between the input and output images, and is often referred to as the scale factor. The sequence $OLP_0$ (box 625) is an intermediate sequence of values generated multiplying each value in the sequence o by the scale factor Pi. The sequences Pleft (box 630) and Pright (box 635) represent, respectively, the floor and ceiling values of—the nearest integers above and below—the OLP SEQUENCE. The sequenced fp (box 640) in FIG. 6 represents the fractional part of the OLP sequence. The sequences Plw (box 645) and Prw (box 650) represent, respectively, the weighting factor of the left pixel and the weighting factor of the right pixel used elsewhere in the system. All values are stored as arrays—pluralities of numerical values—in the computer memory (box 605). It is notable that linear interpolation could be accomplished at this point by an implementation of the function:

$$Linear_o := I_{(Pright_o)} \cdot Prw_o + I_{(Pleft_o)} \cdot Plw_o$$

FIG. 7 illustrates an example of a typical system apparatus realization of the functional method described in FIG. 6. The various members of FIG. 6 are realized as instructions given to a central processing unit which writes the arrays—the pluralities of numerical values—into computer memory. In this example, the size of the input image is 5 and the size of the desired output image is 15. In practice, these sizes are larger by several orders of magnitude. The computer (box 720) in FIG. 7 is analogous to the computer depicted in FIG. 4. The analogy of the members of FIG. 7 to the members of FIGS. 4 and 6 is straightforward.

FIG. 8 shows, in detail the various operations and arrays generated by the derivative estimation sub-systems of box 510 and box 550. A small constant eps (box 810) is set to 0.0625 in the current embodiment. An array $delt_i$ (box 815) is initialized to zero. An array $c_i$ (box 820) is initialized to zero. A new set of values for $delt_i$ are generated according to the rule show in box 825, after these new values are generated, an array $a_i$ is initialized according to the rule shown in box 830. An array $b_i$ is initialized according to the rule shown in box 835. Once the $b_i$ array is initialized the $d_i$ array is initialized according to the rule shown in box 840 using the values from $b_i$. In the one embodiment, five iterations are used for the calculation of the derivative estimates $D_i$ (box 870). In order to generate the derivative estimates the rule shown in box 870 makes reference to the rule shown in box 865. In turn, depending on the image dependent evaluation on the conditional expressions, the rule of box 865 can make reference to either the array stored at the previous iteration, or the rule shown in box 860. Again in turn, the rule of box 860 will either generate a zero value, or reference either the rule of box 855 or the rule of box 850. Under the conditions when the rule of box 855 is referenced, that rule, in turn will reference either the rule of box 845 or the rule of box 850. Both the rule of box 845 and the rule of box 850 are terminal rules—they involve only direct arithmetic calculations.

Similarly, FIG. 9 depicts the calculations required for an embodiment of the interpolated value estimation subsystems of box 530 and box 555. The calculations described in FIG. 8 and FIG. 9 have been reported in the literature (Delbourgo, R., and Gregory, J. A., *C² Rational Quadratic Spline Interpolation to Monotonic Data, IMA Journal of Numerical Analysis,* Vol. 3, 1983, pp. 141–152). However, it can be seen that the direct implementation of these calculations involves complex logical operations, and time consuming iterative processing. Under field conditions, the equations presented in the literature become unstable for non-monotonic data. The logical conditions presented in FIG. 8 are able to overcome non-monotonic instabilities, but the computational cost of the prior art have prevented it from becoming viable.

Figure 10:
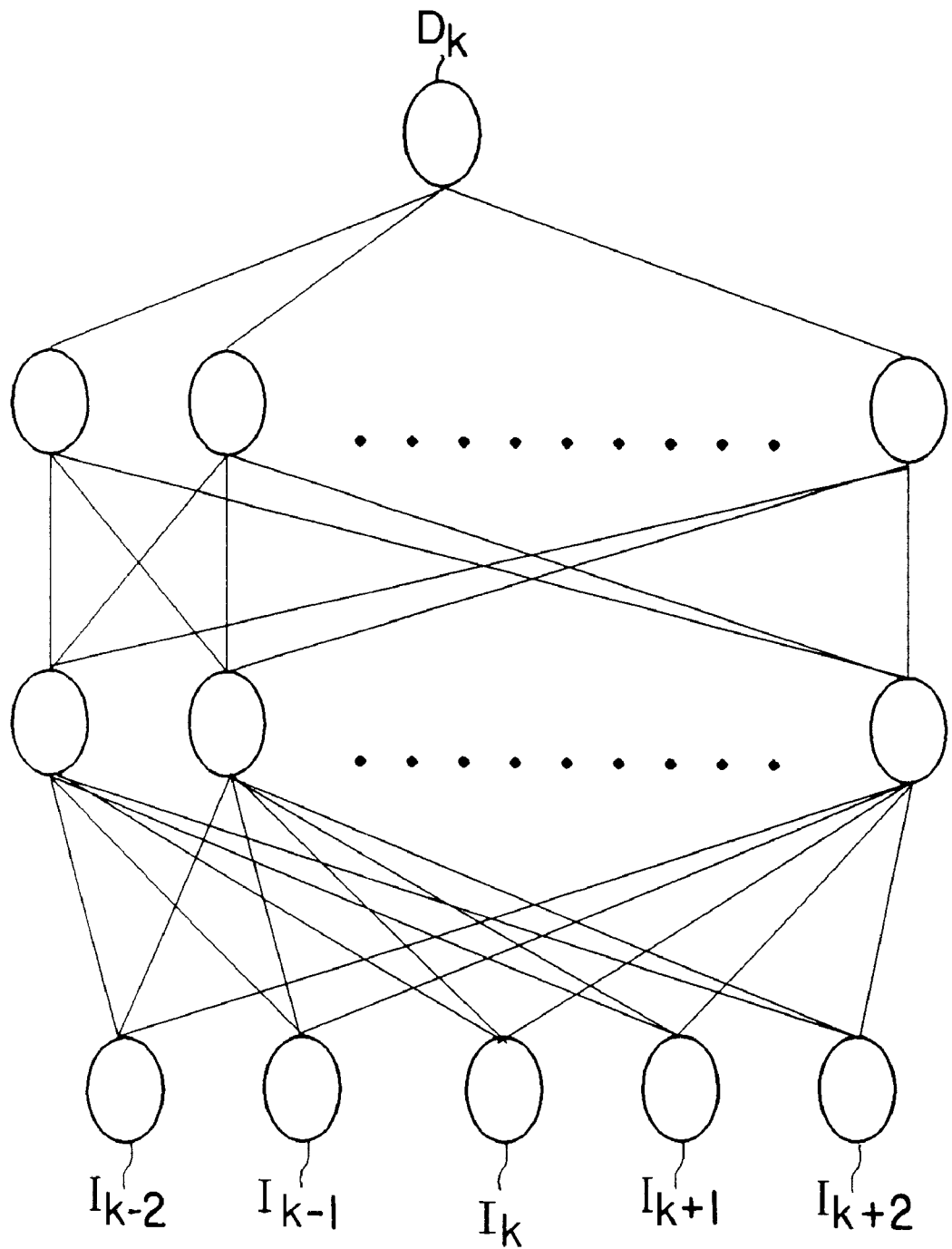
FIG. 10 shows the architecture of a multi-layer perception neural network which can be trained to approximate the derivative estimation functionality of box 310 and box 350. The neural network, once trained has the advantage of eliminating the complex logical operations, iterations, and if statements presented in FIG. 8. The neural network shown in FIG. 10 is, therefore, a computationally superior alternative embodiment of the derivative estimation functionality of box 310 and box 350.
Figure 11:
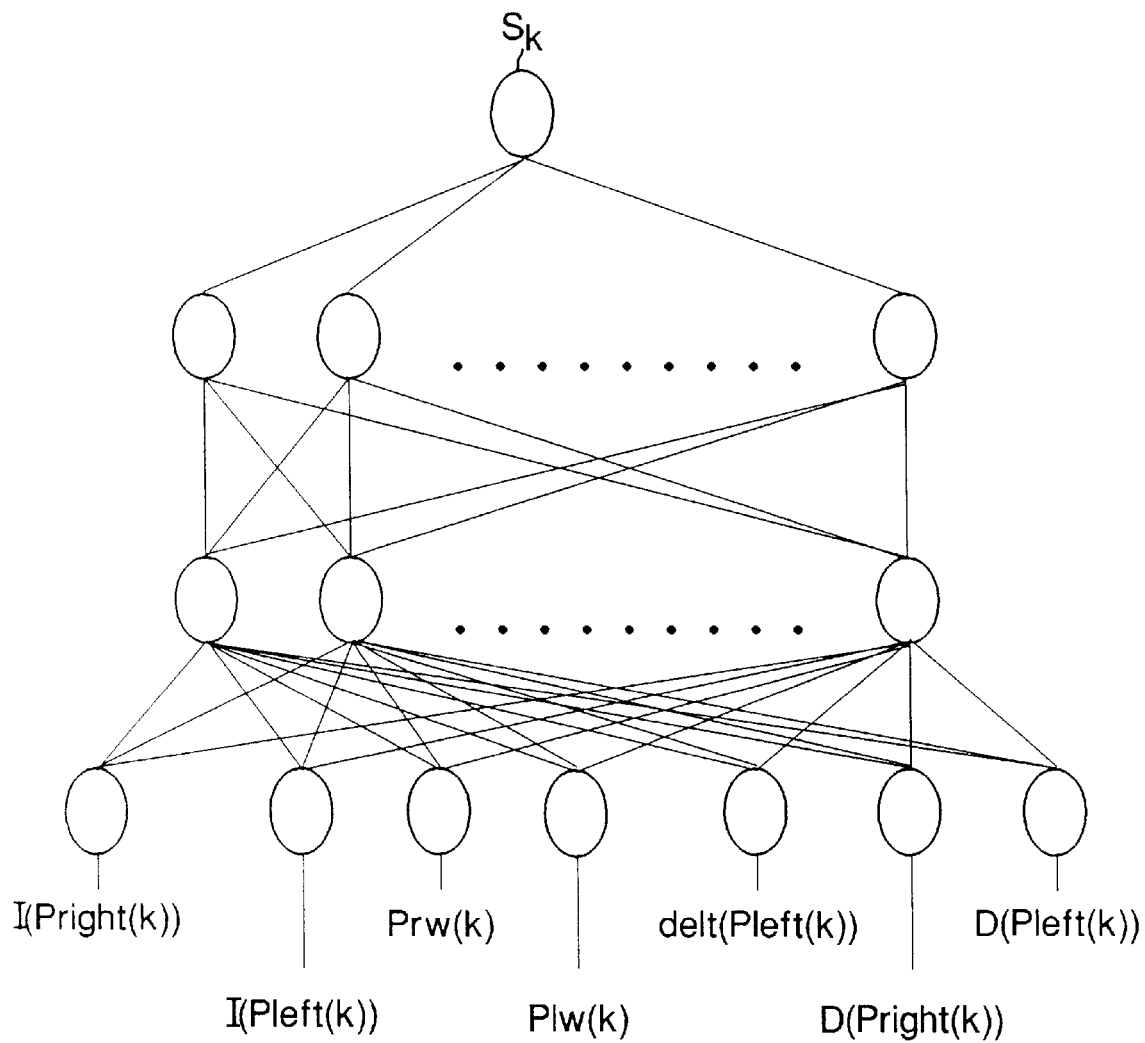
FIG. 11 shows the architecture of a multi-layer perception neural network which can be trained to approximate the interpolated value estimation functionality of box 340 and box 355. The neural network, once trained has the advantage of eliminating the singularities caused by divide by zero errors presented in FIG. 9. The neural network can also be trained to generate output normalized to the limits of the systems of FIG. 3 and FIG. 4. The neural network shown in FIG. 11 is, therefore, a more robust alternative embodiment of the interpolated value estimation functionality of box 530 and box 355.

Therefore, the current invention, rather than using straightforward calculation of the equations in the prior art, uses a neural network universal approximator (Smith, M., *Neural Networks for Statistical Modeling.* P31. Van Nostrand Pub. 1993) as the preferred embodiment for both the derivative estimation and the interpolated value estimation. Neural networks have several advantages for systems of this (Gaborski, R. Auto-learning Method for Distributed Adaptive Networks, U.S. Pat. No. 5,052,043). FIG. 10 shows the architecture for a neural net which yields an efficient estimate of the derivative values. The lines connecting the layers represent the weights or coefficients of the neural network. Such a network can be trained once and the coefficients written to transportable media. The trained neural network avoids the iterative calculations required by the prior art. It also eliminates the need for the complex logical evaluation shown in FIG. 8. In the same way, FIG. 11 shows the preferred embodiment of the interpolated value estimation function. The neural network has the advantage of avoiding the divide by zero singularities existent in the prior art. The neural network also has the advantage of flexibility. The number of hidden nodes and the number of hidden layers can be tuned to the required accuracy of the fielded system. In systems where accuracy is critical a larger network can be trained for increased precision. In systems where speed is critical a smaller network will realize the estimates faster. By avoiding complex conditional branching, the neural network can better exploit the strengths of pipelined digital signal processors and thereby implement a simpler, more reliable, and more computationally efficient system.

The invention has been described in detail with particular reference to certain preferred embodiments thereof, but it will be understood that variations and modifications can be effected within the spirit and scope of the invention.

Parts List

300 x-ray source
310 object
320 image acquisition system
330 digital image
340 image processor
400 memory
410 input device
420 display
430 control/data bus
440 central processing unit
450 transportable storage media drive
460 output device
470 transportable storage media
500 input image
505 desired output
510 derivative estimation subsystems
520 weight estimation subsystem
530 interpolated value estimation subsystem
540 intermediate image
550 derivative estimation subsystem
555 interpolated value estimation subsystem
560 output image
570 weight initialization
575 derivative initialization
605 computer memory
610 sequence of integers named I
615 sequence of integers named o
620 value of Pi
625 sequence $OLP_0$
630 sequence Pleft
635 sequence Pright
640 sequence fp
645 sequence Plw
650 sequence Prw
720 computer
805 computer memory

What is claimed is:

1. A method of processing a digital image comprising the steps of:

providing an input digital image having an input size;

providing the output size of a desired output digital image;

inputting the provided input digital image and the provided desired output digital image size to a weight estimation sub-system which operates to generate several weight derivative estimates;

inputting the provided input digital image to an x-direction derivative estimation sub-system which produces an array of x-direction derivative estimates;

inputting the provided input digital image, the weight derivative estimates and the x-direction estimates to an x-direction interpolated value estimation subsystem which produces in intermediate digital image which has the same number of rows as said input digital image while having the same number of columns as said output digital image;

operating on said intermediate digital image by a y-direction derivative estimation sub-system to produce y-direction derivative estimates; and inputting the intermediate digital image, the weight derivative estimates, and the y-direction derivative estimates to a y-direction interpolated value estimation sub-system to produce said output digital image wherein said x-direction derivative estimation subsystem, said y-direction derivative subsystem, said x-direction interpolated value estimation subsystem, and said y-direction interpolated value estimation subsystem, respectively, use neural network universal approximators trained to emulate the rational quadratic function.

* * * * *